United States Patent Office 3,072,583
Patented Jan. 8, 1963

3,072,583
FOAMABLE COMPOSITION COMPRISING A CO-
POLYMER OF TETRAFLUOROETHYLENE AND
A PERFLUORO-ALPHA-OLEFIN CONTAINING
THEREIN A FLUOROMETHANE AND PROCESS
FOR MAKING SAME
Stuart Karl Randa, Wilmington, Del., assignor to E. I.
du Pont de Nemours and Company, Wilmington, Del.,
a corporation of Delaware
No Drawing. Filed Dec. 18, 1959, Ser. No. 860,335
9 Claims. (Cl. 260—2.5)

This invention relates to a novel composition of matter particularly suited for use in the fabrication of foamed articles.

The fabrication of thermoplastic resins into foamed articles is a well-known art. Since this physical form of a thermoplastic resin has many highly desirable properties and many well-known uses, many processes have been developed for fabricating various resins into foamed articles. One such method involves the thermal decomposition of a chemical agent which has been incorporated in the polymer. Another method involves dissolving a gas such as nitrogen or carbon dioxide in the molten resin as it passes through an extruder. As the resin leaves the die of the extruder, the dissolved gas expands, thereby producing a foam. Still another method involves swelling the resin in a suitable solvent and subsequently extruding the composition at a temperature well above the boiling point of the solvent.

Recently, processes have been discovered for preparing various perfluorocarbon polymers characterized by good fabricability, dielectric strength and very high melting point. It was, therefore, desirable to fabricate these resins into foams having these desirable properties. It was found, however, that the processes useful for preparing foams of other thermoplastics were generally not suitable for preparing foamed articles from perfluorocarbon polymers.

It is an object of this invention to provide a composition of matter useful for preparing foamed articles. It is another object of this invention to provide a process for preparing and utilizing such a composition of matter.

The objects of this invention are accomplished by a composition of matter which comprises melt extrudable perfluorocarbon resin and a fluoromethane represented by the formula:

where X is selected from the group consisting of fluorine, chlorine, bromine and hydrogen. In accordance with the present invention, it was discovered that foams having excellent properties could be prepared from a composition comprising a melt extrudable perfluorocarbon resin having dissolved therein a fluoromethane. In a preferred embodiment, boron nitride is mixed with the resin. The use of boron nitride facilitates control of cell size.

Specific examples of fluoromethanes useful in preparing the composition of the present invention include dichlorodifluoromethane,
chlorodifluoromethane,
dibromodifluoromethane,
bromodifluoromethane,
trichlorofluoromethane,
dichlorofluoromethane,
tribromofluoromethane,
dibromofluoromethane,
dichlorobromofluoromethane,
chlorobromofluoromethane,
chlorotrifluoromethane,
bromotrifluoromethane,
trifluoromethane,
tetrafluoromethane,
difluoromethane and
monofluoromethane.

The preferred fluoromethanes are dichlorodifluoromethane and chlorodifluoromethane.

The invention is applicable to any perfluorocarbon resin which is extrudable in the molten state. Perfluorocarbon resins having an apparent melt viscosity of $1.5 \times 10^3$ to $1 \times 10^7$ poises at maximum permissible extrusion temperatures under a shear stress of 6.5 pounds per square inch are preferred. The dissolution of fluoromethanes in such resins causes an appreciable reduction in apparent melt viscosity, and thus facilitates rapid melt extrusion. Examples of perfluorocarbon resins which may be employed includes, generally, perfluorocarbon resins having a branched chain structure such as hexafluoropropylene homopolymers, copolymers of tetrafluoroethylene or a hexafluoropropylene with each other or with one or more other perfluoro-α-olefins of 3 to 9 carbon atoms. Interpolymers of hexafluoropropylene and tetrafluoro-ethylene having apparent melt viscosities in the range of $3 \times 10^4$ to $1 \times 10^6$ poises and a combined hexafluoropropylene content in the range of at least 4 to 25 weight percent are especially preferred for high thermal stability.

Surprisingly, it was found that the fluoromethanes easily dissolved in the instant fluorocarbon resins at approximately atmospheric pressure and room temperature which is in sharp contrast with nitrogen which requires several hundred pounds of pressure to achieve any appreciable amount of solution. Of course, pressures higher than atmospheric may be used if desired, but it is generally not necessary for most applications. The use of higher pressures generally results in a composition which produces foams having low density. In general, it is preferred to employ a pressure and exposure time such that 0.1% to 5% by weight, based on the total composition, of the fluoromethane is dissolved in the fluorocarbon resin.

Another surprising feature of this invention is that the resin need not be extruded immediately after exposure to the fluoromethane. This feature, in combination with low pressure necessary for impregnation, causes many highly desirable results. For example, no special equipment is necessary to carry out the foaming process. In general, the resin may be exposed to the fluoromethane in an ordinary container. In many cases, the shipping container for the polymer can be used. Likewise, most of the extrusion equipment presently used in the art for making solid articles may be used with the composition of this invention to produce foamed articles. The extruder need not have a pressurized hopper nor need the extruder be modified to provide a gas inlet as required by other prior art methods. The composition of the invention may be exposed to the atmosphere for many hours and in some cases even for days without destroying the foaming properties of the resin.

In preparing foamed thermoplastics, it is a common practice to employ an agent to control the size of the cells formed. Examples of common agents include finely divided alumina, silica gel and titanium dioxide. It was found however, that these prior art "nucleating agents," as they are often called, were not effective in controlling the cell size in the fluorocarbon resins of the instant invention. Surprisingly, it was found that boron nitride was particularly effective in controlling cell size in these resins. The amount of boron nitride employed is not critical. In general however, amounts above 0.1% by weight, based on the total composition, were found most effective. When boron nitride having an extremely small particle size is used, a smaller amount may be employed in many instances. Boron nitride having an average particle size of less than 10 microns is preferred. The amount of boron nitride incorporated in the polymer has no upper limit, except that for economic reasons, more than 10% boron nitride is seldom used.

It is important that the boron nitride be well dispersed in the resin prior to the foaming step. This may be accomplished in any number of ways known to those skilled in the art. For example, the polymer may be milled with the boron nitride in a suitable mill. The boron nitride may also be mixed with the resin during the extrusion operation, during the synthesis of the resin, or by a separate extrusion prior to the impregnation with fluoromethane.

Melt viscosities used herein are determined by the method set forth in Belgian Patent No. 560,454, granted September 14, 1957, unless otherwise stated.

As used herein, the term "fluoromethane" means a compound containing one carbon atom at least one fluorine atom.

Unless otherwise stated, all parts and percentages used herein are by weight.

To further illustrate the various aspects of the present invention, the preferred embodiments thereof, and the advantageous results to be obtained thereby, the following examples are included.

*Example I*

A resinous interpolymer of tetrafluoroethylene and hexafluoropropylene having a melt viscosity of $8.2 \times 10^4$ poises and containing 15% combined hexafluoropropylene was milled with 1% by weight of boron nitride in a Farrel-Birmingham "B Banbury Mixer." After 15 minutes of milling, the mechanical energy applied by the mill had raised the resin temperature to 350° C. and the boron nitride was well dispersed in the resin. After the mixture had cooled, it was shredded and extruded into molding cubes having the shape of elliptical cylinders having a height of about .150 inch, a major axis of .130 inch and a minor axis of .075 inch.

The molding cubes were exposed to chlorodifluoromethane under a pressure of 7 p.s.i.g. for five days at room temperature. A 45 mil foamed coating of the interpolymer was applied to a 19 gauge wire by extruding the molding cubes containing the chlorodifluoromethane through a 1½ inch National Rubber Extruder equipped with a .090 inch extrusion die. Coating was applied at the rate of 37 feet per minute. The melt temperature was 390° C. and the melt pressure was 325 p.s.i.g. A slight vacuum was applied to the wire guide to remove gas between the wire and the coating. The extrusion die orifice was heated to approximately 500° C. by means of an induction heater placed near the die orifice. The coated wire was quenched in a water bath placed 2 inches from the extrusion die. The wire coating thus obtained was a cellular foam having non-interconnected cells 1 to 3 mils in diameter, a specific mass of about 1.02 g./cc., a void content of about 53% and a dielectric constant of 1.47. The coating had a smooth surface and was tight to the wire.

Substantially the same results are also obtained by substituting for the interpolymer of this example, a homopolymer of hexafluoropropylene having a melt viscosity of $7.2 \times 10^4$ poises measured at 290° C. under a shear stress of 6.5 p.s.i. A suitable process for preparing such polymers is by contacting hexafluoropropylene under a pressure of 3000 atmospheres with 0.5% by weight of mercury bis-trifluoromethylmercaptide at a temperature of about 225° C. Substantially the same results are obtained by substituting for the interpolymer of this example a copolymer of tetrafluoroethylene and perfluorohexene-1 having a melt viscosity of $3.2 \times 10^5$ poises at 380° C. and containing approximately 0.8% of combined perfluorohexene-1. A suitable process for preparing copolymers of tetrafluoroethylene and perfluoro-α-olefins is by contacting the comonomers with about 0.005 weight percent of perfluorobutyryl peroxide at a temperature of 60° C. and a pressure of 1 to 200 atmospheres in the presence of an inert perfluorinated solvent.

*Example II*

Using substantially the same equipment and procedure as Example I, molding cubes containing 1% by weight of dispersed boron nitride were exposed to dichlorodifluoromethane under ambient atmospheric pressure for four days.

After extrusion there was obtained a cellular wire coating having non-interconnected cells 0.5 to 2 mils in diameter, a specific mass of about 1.50 g./cc., a void content of 28%, and a dielectric constant of 1.76. In other respects, the coating obtained was substantially identical to that of Example I. Substantially the same results are obtained by substituting for the dichlorodifluoromethane of this example, dibromodifluoromethane, dibromofluoromethane, chlorotrifluoromethane, dichlorofluoromethane, trichlorofluoromethane, bromodifluoromethane, monofluoromethane, tetrafluoromethane, tribromofluoromethane, bromotrifluoromethane, difluoromethane, and tetrafluoromethane.

*Example III*

Using substantially the same equipment and procedure as Example I, molding cubes containing boron nitride were exposed to 1,2-dichloro-1,1,2,2-tetrafluoroethane under ambient atmospheric pressure for three days.

After extrusion, there was obtained a coating having less than 1% voids.

*Example IV*

Using substantially the same equipment and procedure of Example I, molding cubes were prepared containing 1% dispersed aluminum oxide. These molding cubes were exposed to chlorodifluoromethane for 4 days at 50 p.s.i.g.

After extrusion, there was obtained a foamed coating having a cell size of about 15 mils, a specific mass of about 0.93 g./cc., and a void content of 57%. The dielectric constant was not measured because of holes in the wire coating. Substantially the same results are obtained by substituting for the aluminum oxide of this example, titanium dioxide, silica gel and polychlorinated copper phthalocyanine.

The foregoing examples are merely illustrations of certain embodiments of the invention, and are not to be construed as limitations thereof. Many modifications will be apparent without departing from the scope of the invention.

The compositions of the present invention are useful in fabricating foamed articles such as rods, tubes, pipes, film, sheeting and the like, and for applying foamed coatings on articles such as wire, screen, cloth, paper, cardboard and the like.

I claim:

1. A composition of matter suitable for preparing foamed articles which comprises a melt extrudable copolymer of tetrafluoroethylene and a perfluoro-α-olefin having from 3 to 9 carbon atoms containing therein a fluoromethane represented by the formula:

$$\text{F}-\underset{\underset{X}{|}}{\overset{\overset{X}{|}}{\text{C}}}-\text{X}$$

wherein X is selected from the group consisting of fluorine, chlorine, bromine and hydrogen.

2. The composition of claim 1 wherein the fluoromethane is dichlorodifluoromethane.

3. The composition of claim 1 wherein the fluoromethane is chlorodifluoromethane.

4. A composition of matter suitable for preparing foamed articles which comprises an interpolymer of tetra-

fluoroethylene and hexafluoropropylene having at least 4% by weight of combined hexafluoropropylene and containing therein dichlorodifluoromethane and boron nitride.

5. A composition of matter suitable for preparing foamed articles which comprises an interpolymer of tetrafluoroethylene and hexafluoropropylene having at least 4% by weight of combined hexafluoropropylene and containing therein chlorodifluoromethane and boron nitride.

6. A process for preparing foamed articles which comprises exposing a melt extrudable copolymer of tetrafluoroethylene and a perfluoro-α-olefin having from 3 to 9 carbon atoms in the solid state to an atmosphere of a gaseous fluoromethane represented by the formula:

$$\text{F}-\underset{\underset{\text{X}}{|}}{\overset{\overset{\text{X}}{|}}{\text{C}}}-\text{X}$$

wherein X is selected from the group consisting of fluorine, chlorine, bromine and hydrogen; at approximately ambient atmospheric pressure and subsequently extruding said interpolymer and recovering a foamed article formed thereby.

7. The process of claim 6 wherein the perfluorocarbon resin is in mixture with boron nitride.

8. The process of claim 6 wherein the fluoromethane is chlorodifluoromethane.

9. The process of claim 6 wherein the fluoromethane is dichlorodifluoromethane.

References Cited in the file of this patent

UNITED STATES PATENTS

| | | |
|---|---|---|
| 2,576,977 | Stober | Dec. 4, 1951 |
| 2,871,216 | Anderson | Jan. 27, 1959 |
| 2,911,382 | Barkhuff | Nov. 3, 1959 |
| 2,945,827 | Herning | July 19, 1960 |